United States Patent [19]

Nagai et al.

[11] Patent Number: 5,352,359
[45] Date of Patent: Oct. 4, 1994

[54] ULTRAVIOLET REACTOR WITH MIXING BAFFLE PLATES

[75] Inventors: Hiroshi Nagai; Ken Nakajima, both of Kanagawa; Yukio Ikeda, Tokyo; Noriyoshi Mashimo, Iwate, all of Japan

[73] Assignees: Ebara Corporation, Tokyo; Kabushiki Kaisha Toshiba, Kawasaki, both of Japan

[21] Appl. No.: 11,904

[22] Filed: Feb. 1, 1993

[30] Foreign Application Priority Data

Feb. 5, 1992 [JP] Japan ................................ 4-047778

[51] Int. Cl.$^5$ ........................................... C02F 1/32
[52] U.S. Cl. ........................................ 210/192; 210/748; 250/436; 250/437; 422/186.3; 422/24
[58] Field of Search ............. 210/748, 192, 199, 202, 210/206, 764; 250/428, 432 R, 436, 437, 438; 422/186.07, 186.3, 24

[56] References Cited

U.S. PATENT DOCUMENTS

| | | | |
|---|---|---|---|
| 1,196,481 | 8/1916 | Von Recklinghausen et al. | 250/437 |
| 3,138,708 | 6/1964 | Ellner et al. | 250/437 |
| 3,671,741 | 6/1972 | Woodbridge et al. | 250/436 |
| 3,903,000 | 9/1975 | Miura et al. | 210/522 |
| 3,924,139 | 12/1975 | Hirose et al. | 422/186.3 |
| 4,372,860 | 2/1983 | Kaas | 210/748 |
| 4,471,225 | 9/1984 | Hillman | 250/437 |
| 4,849,115 | 7/1989 | Cole et al. | 210/192 |
| 4,897,246 | 1/1990 | Peterson | 422/186.3 |
| 4,952,376 | 8/1990 | Peterson | 422/186.3 |
| 4,968,489 | 11/1990 | Peterson | 250/436 |
| 5,178,758 | 1/1993 | Hwang | 422/186.3 |
| 5,208,461 | 5/1993 | Tipton | 250/437 |

FOREIGN PATENT DOCUMENTS

| | | |
|---|---|---|
| 62-234591 | 10/1987 | Japan . |
| 1-284385 | 11/1989 | Japan . |
| 3-61982 | 6/1991 | Japan . |
| 875993 | 8/1961 | United Kingdom ............ 250/432 |

*Primary Examiner*—Cynthia L. Nessler
*Attorney, Agent, or Firm*—Oblon, Spivak, McClelland, Maier & Neustadt

[57] ABSTRACT

An ultraviolet reactor for purifying a liquid, comprising a housing of circular or rectangular cross-sections, a multiplicity of ultraviolet lamps accommodated in the housing, an inlet and outlet for the liquid, which are provided at both ends, respectively, of the housing, and a plurality of mixing baffle plates provided inside the housing at a proper pitch along a longitudinal axis of the housing so that the liquid flows at right angles to the ultraviolet lamps.

9 Claims, 6 Drawing Sheets

ULTRAVIOLET REACTOR WITH MIXING BAFFLE PLATES

BACKGROUND OF THE INVENTION

1. Field of the Art

The present invention relates to an ultraviolet reactor (hereinafter referred to as "UV reactor") and, more particularly, to a UV reactor which uses ultraviolet lamps (hereinafter referred to as "UV lamps") and which is provided with mixing baffle plates for removing bacteria, organic matter and dissolved oxygen from a liquid to be treated.

2. Prior Art

As UV reactors employed for purification of liquids in the fields of manufacturing semiconductor devices, chemicals, foodstuffs, etc., the following two types of reactor have heretofore been known, that is, one in which UV lamps are merely accommodated in the UV reactor, and another in which the UV reactor is provided with baffle plates and straightening plates to swirl a liquid to be treated so as to increase the probability of the liquid colliding with the UV lamps.

UV lamps that are provided in UV reactors are costly. Even if the amount of water to be treated increases, the cost of UV lamps still comprises a high percentage of the total cost of the system. Therefore, the cost will not decrease. With the conventional systems in which UV lamps are merely accommodated in the UV reactor, or baffle plates and straightening plates are used to increase the efficiency, the irradiation efficiency cannot actually be improved. Thus, the conventional UV reactors are uneconomical.

SUMMARY OF THE INVENTION

It is, therefore, an object of the present invention to provide an economical and efficient UV reactor by experimentally analyzing the relationship between the behavior of water in the UV reactor and UV lamps.

To accomplish the above-described object, the present invention provides a UV reactor for purifying a liquid, comprising a housing of circular or rectangular cross-sections, a multiplicity of UV lamps accommodated in the housing, an inlet and outlet for the liquid, which are provided at both ends, respectively, of the housing, and a plurality of mixing baffle plates provided inside the housing at a proper pitch along a longitudinal axis of the housing so that the liquid flows at right angles to the UV lamps.

In the above-described UV reactor, since the liquid flows laterally to the longitudinal axis of the housing, it is preferable for the reactor to have a rectangular cross-sectional configuration, not a circular one, with a view to obtaining a uniform flow velocity distribution. Preferably, the baffle plates are provided such that the mounting pitch of the baffle plates is relatively large at the inlet side to increase the contact time with the UV lamps, where the impurity concentration is relatively high, whereas it is relatively small at the outlet side, where the impurity concentration is relatively low. In addition, when the reactor comprises a circular housing, the baffle plates have a circular cross-sectional configuration, whereas, when the reactor comprises a rectangular housing, the baffle plates have a rectangular cross-sectional configuration. Preferably, the clearances between the baffle plates and the UV lamps are minimized or made zero, and the cross-sectional area of flow path of each baffle plate is minimized so far as the pressure loss is permitted, i.e. the pressure loss of the liquid passing through the flow path of each baffle plate is kept at 50 mm Aq or more (wherein Aq is a pressure unit which indicates a pressure corresponding to a weight of a water column having a given height or 5 g/cm), thereby allowing the liquid to flow in a state close to a completely mixed flow in the area between each pair of adjacent baffle plates. For example, it is preferable that the flow path cross-sectional area of each baffle plate should be about 4% to 10% of the cross-sectional area of the housing in the case of a rectangular reactor.

The cross-sectional area of the reactor depends on the number of UV lamps installed and the mounting pitch thereof, and the length of the reactor can be determined by the length of time that the liquid is irradiated with the UV lamps.

In the spectrum of light radiated from the UV lamps, UV light of wavelength 254 nm, which is used for sterilization, has an excellent water penetrating rate and can therefore be effectively used. However, UV light of wavelength 185 nm, which is effective for the decomposition of the organic component (TOC: Total Organic Carbon) and for the removal of dissolved oxygen, is inferior in the water penetrating rate, as shown in FIG. 3.

In FIG. 3, Io denotes the energy of light from a UV lamp, while I denotes the level of energy after penetration through a certain thickness of water. I/Io represents the penetrating rate of the energy. In the graph of FIG. 3, the amount of oxygen dissolved (DO: Dissolved Oxygen) in water is used as a parameter. It will be understood from the graph that when the water thickness is 5 mm and the amount of oxygen dissolved (DO) in water is 100 ppb, UV light of wavelength 185 nm penetrates only 22%.

FIG. 3 shows static characteristics, but it is important in the design of a UV reactor to understand dynamic characteristics which are exhibited when water is actually passed through the UV reactor with UV lamps installed therein.

To this end, experiments were carried out with a system as shown in FIG. 4, using UV lamps of 70 W×1,100 L, to obtain the relationship between the residence time in the reactor, that is, the length of time that the fluid is irradiated with the UV lamps, and the rate of removal of dissolved oxygen, with the thickness t of water around the outer periphery of each UV lamp protecting tube and the inlet DO concentration used as parameters.

The system shown in FIG. 4 comprises an outer cylinder 11 encircling UV lamp protecting tubes 12, a $H_2$ gas additioning membrane unit 13, a deaerator 14, a liquid tank 15, a pump 16 and DO meters 17, 17. $N_2$ gas is sealed within the tank to prevent contact of the liquid with an air.

In operation, a liquid is supplied from the tank 15 to the deaerator 14 by the pump 16 and there the DO concentration in the liquid is lowered to around 300 ppb by the deaerator 14. The liquid is then supplied to the $H_2$ gas additioning membrane unit 13 and there the DO concentration in the liquid is controlled to a predetermined inlet DO concentration, i.e. 300 ppb, 200 ppb and 100 ppb, in this case, by changing the additional volume of $H_2$ gas added to the liquid. The DO concentration at the inlet and the outlet of the reactor is detected by the DO meters 17, 17. The length of time in which the liquid contacts with the UV lamps, or the residence time in the reactor, is changed by controlling the drain rate of the excess liquid from the system. The thickness t of the liquid around the outer periphery of each UV lamp protecting tube is changed by replacing the unit of the UV lamp protecting tubes 12 and the outer cylinder 11 with others having different water thickness.

FIG. 5 shows the results of the experiments where the inlet DO concentration was selected at 100 ppb, 200 ppb and 300 ppb, and the water thickness t was selected at 2.5 mm, 5.0 mm and 6.5 mm as parameters. In the graph shown in FIG. 5, the line where the inlet DO concentration is 100 ppb and water thickness is 6.5 mm, and the line where the DO concentration is 300 ppb and the water thickness is 2.5 mm are overlapped and thus are shown in a single line.

It will be understood from FIG. 5 that even if the inlet DO concentration is 300 ppb, about 80% of the dissolved oxygen can be removed as long as the water thickness is 5 mm and the residence time is at least 30 seconds.

Further, the relationship between the change in the number of DO molecules in the UV reactor and the number of stages of baffle plates (mixing baffle plates) was obtained from a stochastic equation. The results of the calculation are shown in FIG. 6. In FIG. 6, 300, 150 100 and 50 were used as parameters, for the number of DO molecules at the inlet of the UV reactor.

It will be understood from FIG. 6 that a powerful baffle effect is shown in the initial stage where the impurity concentration (the number of DO molecules in this case) is high, and the baffle effect is relatively weak below a certain impurity concentration.

The above and other objects, features and advantages of the present invention will become more apparent from the following description when taken in conjunction with the accompanying drawings in which a preferred embodiment of the present invention is shown by way of illustrative examples.

PREFERRED EMBODIMENT OF THE INVENTION

The present invention will be described below more specifically by way of one embodiment and with reference to the accompanying drawings. However, the present invention is not necessarily limited to this embodiment.

Figure 1:
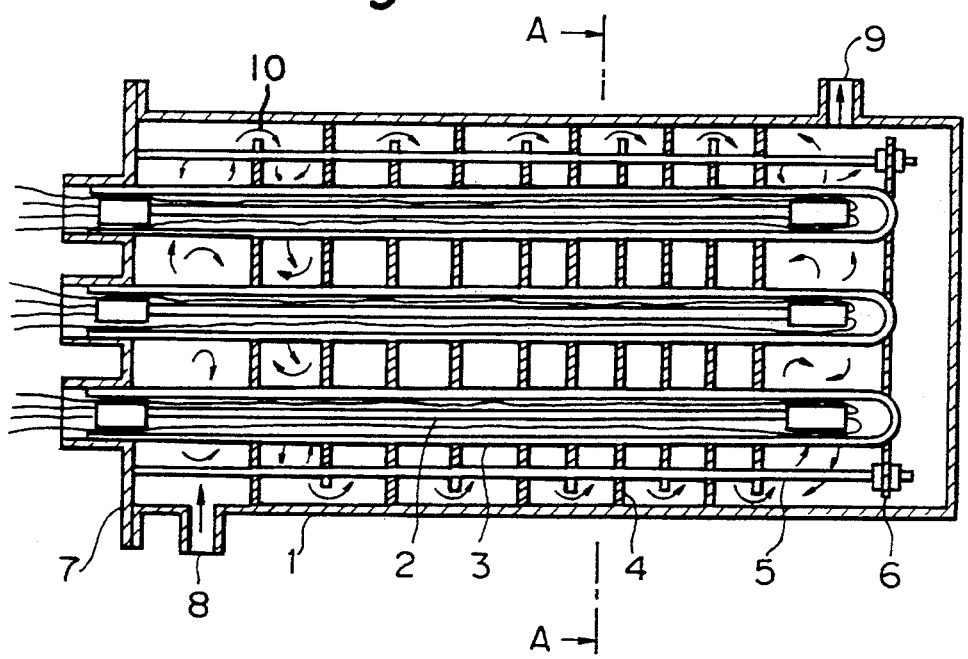
FIG. 1 is a horizontal sectional view of the UV reactor according to one example of the present invention.

FIG. 1 shows the UV reactor according to the present invention, in which a plurality of mixing baffle plates 4 are set in a rectangular housing 1 by using tie rods 5 such that the mounting pitch of the baffle plates 4 is relatively long at the inlet (8) side, whereas it is relatively short at the outlet (9) side.

Each baffle plate 4 includes a plurality of holes for receiving UV lamp protecting tubes 3 therein, and the protecting tubes 3 are initially inserted into the rectangular housing 1 with the baffle plates 4 spacedly connected by the tie rods 5 and attached to the protecting tubes 3. The tie rods 5 are fixed to a side cover 7 and the protecting tubes 3 are sealingly inserted in the openings in the side cover 7. A plurality of flow paths 10 are provided in the periphery of each baffle plate 4.

It should be noted that reference numeral 2 denotes UV lamps received in the protecting tubes 3, and reference numeral 6 denotes a bracing plate, for preventing movement of the protecting tubes.

The protecting tube 3 is made of a transparent material such as silica glass.

The arrows in the figure show the flow of water as a model (not shown in the intermediate stages).

Figure 2:
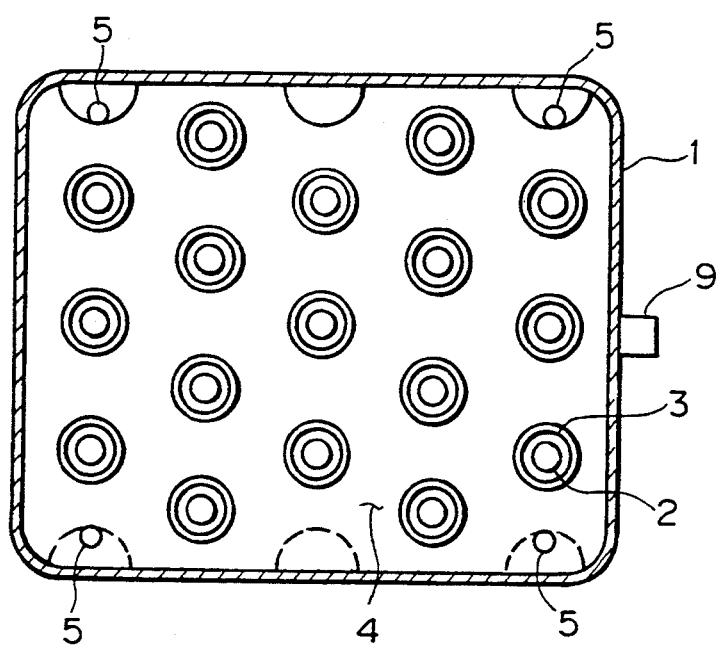
FIG. 2 is a sectional view taken along the line A—A in FIG. 1.
Figure 3:
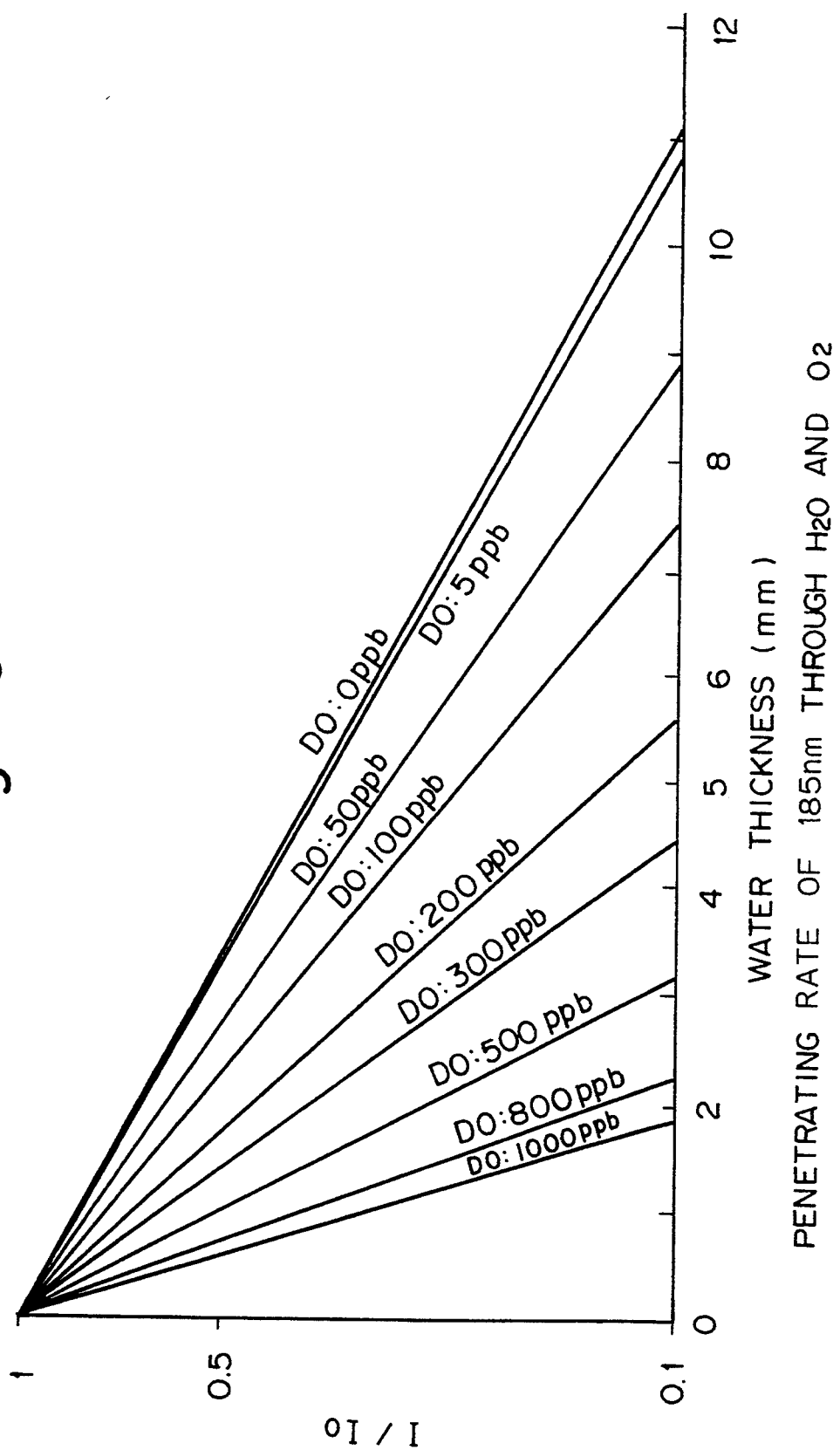
FIG. 3 is a graph showing the penetrating rate of UV light of wavelength 185 nm through water and oxygen.
Figure 4:
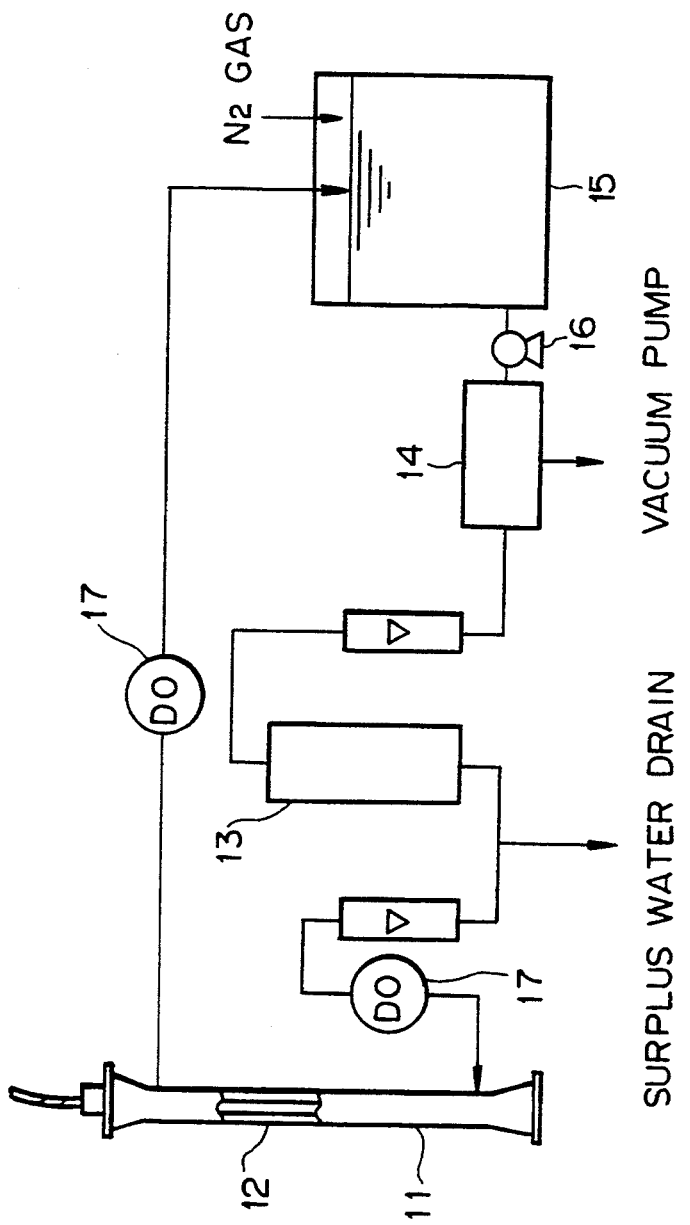
FIG. 4 is an experimental system used to investigate the rate of removal of DO.
Figure 5:
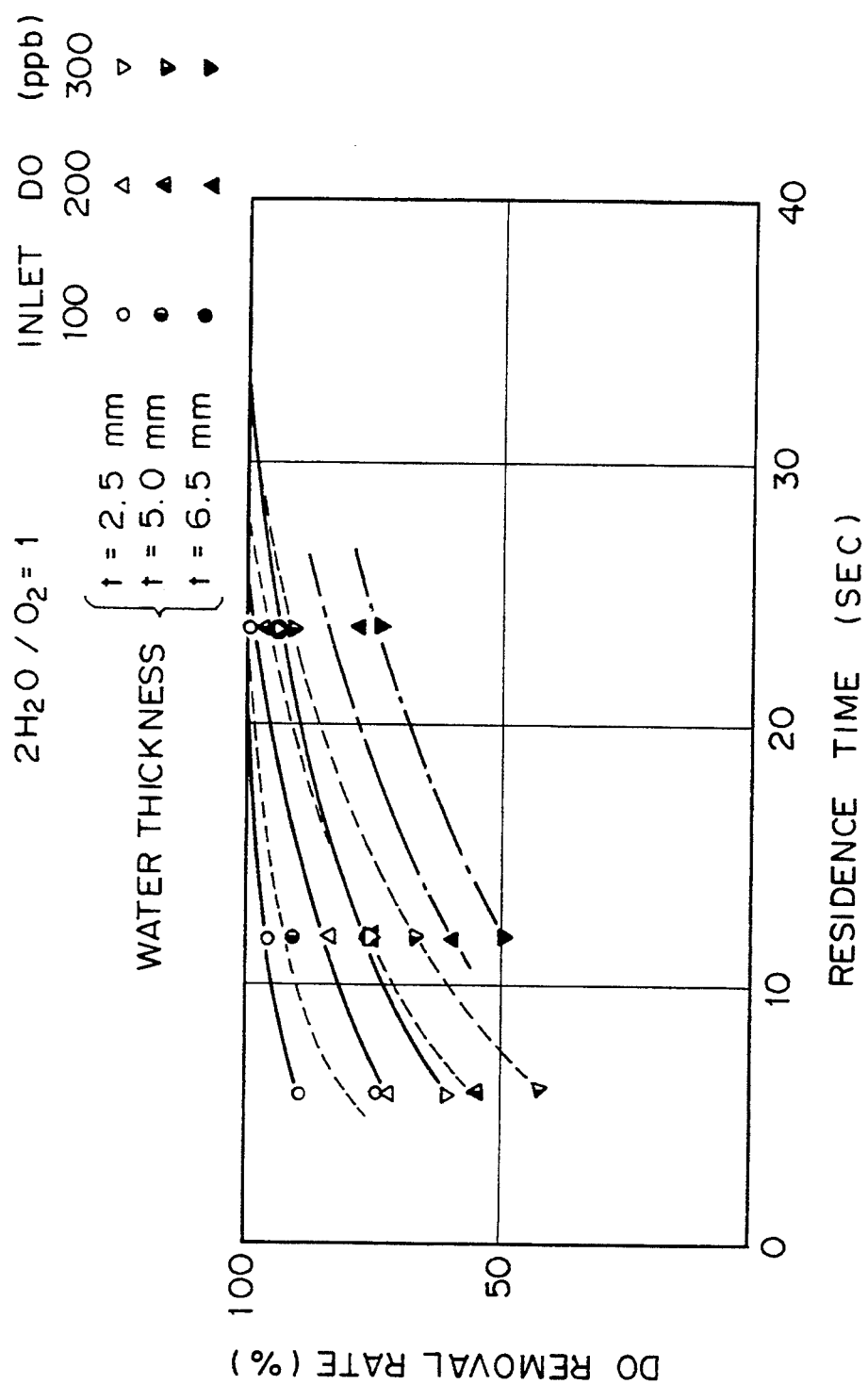
FIG. 5 is a graph showing the rate of removal of DO experimentally obtained by using the system shown in FIG. 4.
Figure 6:
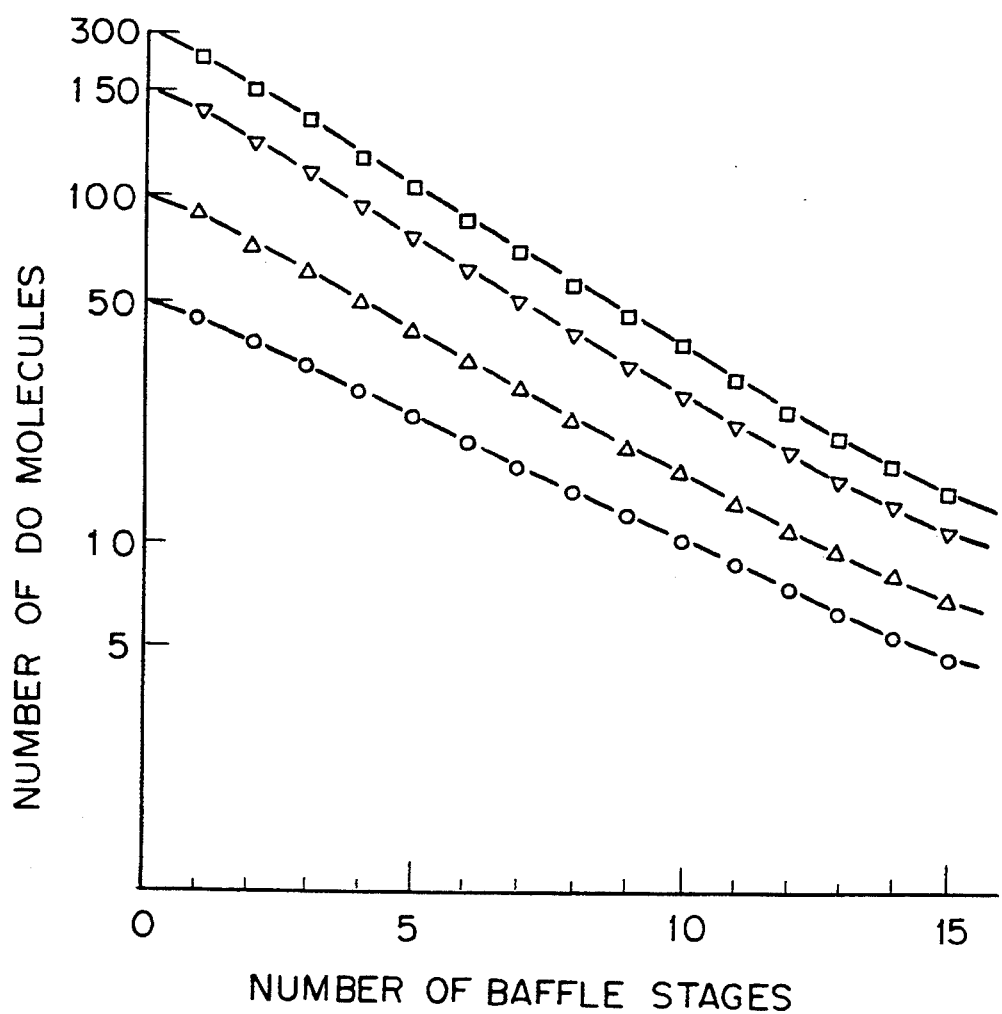
FIG. 6 is a graph showing the relationship between the change in the number of DO molecules and the number of baffle stages.

FIG. 2 is a sectional view taken along the line A—A in FIG. 1.

The decomposition performance of the rectangular reactor shown in FIG. 1 was compared with that of a circular reactor with ethyl alcohol taken as an example of the organic component.

The configurations and sizes of the reactors used and the treating conditions are shown in Table 1 below.

TABLE 1

| Type of reactor | Circular reactor | Retangular reactor |
|---|---|---|
| Size of reactor | Inner diameter × Length 310 Φ × 1200 L | Major axis × Minor axis × Length 320 × 250 × 810 L |
| Rate of treatment | 5 m³/h | 5 m³/h |
| Residence time | 66.67 sec | 46.55 sec |
| Ratio of opening area of baffle plate | about 7.6% | about 5.2% |
| Number of baffle stages | 20 | 11 |
| Mounting pitch | 50 mm | Water inlet side 100 mm Water outlet side 50 mm |
| Mean flow velocity | 1.8 cm/s | 1.74 cm/s |
| Lamp input | 1,330 W | 1,240 W |

Figure 7:
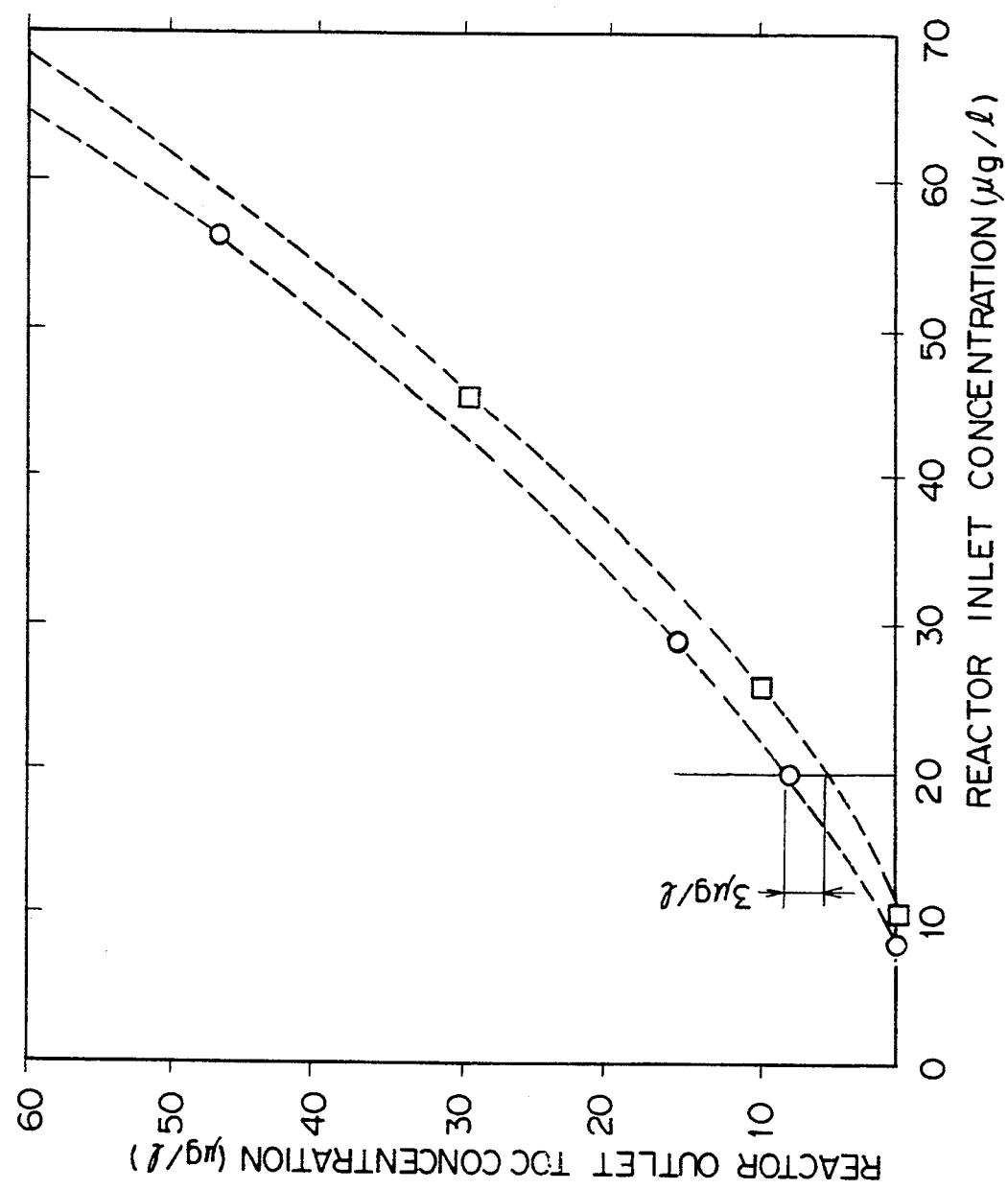
FIG. 7 is a graph showing the comparison in performance between circular and rectangular reactors.

The results of the comparison are shown in FIG. 7. In the graph shown in FIG. 7, the axis of the abscissas represents the reactor inlet concentration of ethyl alcohol, while the axis of ordinates represents the TOC concentration at the reactor outlet. The performance of the circular reactor is shown by plots by —o—, while the performance of the rectangular reactor is shown by plots —□—. As will be clear from FIG. 7, the rectangular reactor provides a higher efficiency despite the fact that the input of the UV lamps is lower than that in the circular reactor. For example, the outlet concentration of the rectangular reactor when the inlet concentration is 20 μg/l is lower by 3 μg/l than that of the circular reactor.

As stated above, in the invention, interior components of the UV reactor, particularly mixing baffle plates, are installed at various pitches, thereby increasing the length of time that the liquid to be treated is in contact with the UV lamps and raising the probability of the liquid colliding with the UV lamps. Thus, the present invention contributes largely to the removal of impurities, and it is possible to reduce the number of UV lamps used and also the number of silica glass protecting tubes used.

What is claimed is:

1. An ultraviolet reactor for purifying a liquid, the ultraviolet reactor comprising:
    a housing having a circular or rectangular cross-section, said housing comprising a liquid inlet side having a first end with an inlet for the liquid, and a liquid outlet side having a second end with an outlet for the liquid;
    a plurality of ultraviolet lamps accommodated in said housing; and
    a plurality of mixing baffle plates provided inside said housing at a mounting pitch along a longitudinal axis of said housing so that the liquid flows at right angles to said ultraviolet lamps;
    wherein:
    said baffle plates are provided in said housing such that the mounting pitch of the baffle plates at the liquid inlet side of the housing is relatively large and the mounting pitch of the baffle plates at the liquid outlet side of the housing is relatively small.

2. A ultraviolet reactor according to claim 1, wherein each of said ultraviolet lamps is inserted in a protecting tube made of a transparent material.

3. An ultraviolet reactor according to claim 2, wherein said transparent material is silica glass.

4. An ultraviolet reactor according to claim 2, wherein said baffle plates are spaced by a plurality of tie rods which extend in the longitudinal axis of said housing and include a plurality of holes for receiving said protecting tubes therein.

5. An ultraviolet reactor according to claim 4, wherein said protecting tubes are initially inserted into said housing with said baffle plates spacedly connected by said tie rods and attached to said protecting tubes and then said tie rods and the protecting tubes are fixed to a side cover of said housing.

6. An ultraviolet reactor according to claim 2, wherein, in said housing having said circular cross-section, said baffle plates have a circular cross-sectional configuration, and clearances between each of said baffle plates and said protecting tubes are made zero, wherein a cross-sectional area of a flow path of each baffle plate is so selected that a pressure loss of a liquid passing through the flow path of each baffle plate is kept at 50 mm Aq or more.

7. An ultraviolet reactor according to claim 6, wherein said cross-sectional area of said flow path of each baffle plate is within 4 to 10% of a cross-sectional area of said housing.

8. An ultraviolet reactor according to claim 2, wherein, in said housing having said rectangular cross-section, said baffle plates have a rectangular cross-sectional configuration, and clearances between each of said baffle plates and said protecting tubes are made zero, wherein a cross-sectional area of a flow path of each baffle plate is so selected that a pressure loss of a liquid passing through the flow path of each baffle plate is kept at 50 mm Ag or more.

9. An ultraviolet reactor according to claim 8, wherein said cross-sectional area of said flow path of each baffle plate is within 4 to 10% of a cross-sectional area of said housing.

* * * * *